United States Patent
Yi et al.

(10) Patent No.: US 12,547,268 B2
(45) Date of Patent: Feb. 10, 2026

(54) METHOD AND APPARATUS FOR DISPLAYING OPERATION INTERFACE AND TOUCHSCREEN TERMINAL

(71) Applicant: Honor Device Co., Ltd., Shenzhen (CN)

(72) Inventors: Jie Yi, Shenzhen (CN); Kai Qian, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/819,862

(22) Filed: Aug. 29, 2024

(65) Prior Publication Data

US 2024/0419279 A1    Dec. 19, 2024

Related U.S. Application Data

(63) Continuation of application No. 18/304,481, filed on Apr. 21, 2023, now Pat. No. 12,086,347, which is a continuation of application No. 17/947,456, filed on Sep. 19, 2022, now Pat. No. 11,669,195, which is a continuation of application No. 15/293,811, filed on (Continued)

(30) Foreign Application Priority Data

Apr. 15, 2014 (CN) .......................... 201410150798.8

(51) Int. Cl.
*G06F 3/041* (2006.01)
*G06F 3/0482* (2013.01)
*G06F 3/04883* (2022.01)
*G06F 3/04886* (2022.01)
*G06F 3/0481* (2022.01)

(52) U.S. Cl.
CPC ............ *G06F 3/0416* (2013.01); *G06F 3/041* (2013.01); *G06F 3/0482* (2013.01); *G06F 3/04883* (2013.01); *G06F 3/04886* (2013.01); *G06F 3/0481* (2013.01); *G06F 2203/04803* (2013.01)

(58) Field of Classification Search
CPC ...... G06F 3/041; G06F 3/0482; G06F 3/0416; G06F 3/04883; G06F 3/04886; G06F 3/0481; G06F 2203/04803
See application file for complete search history.

(56) References Cited

U.S. PATENT DOCUMENTS 5,303,388 A    4/1994    Kreitman et al.
5,463,725 A    10/1995   Henckel et al.
(Continued)

FOREIGN PATENT DOCUMENTS

CN    101571785 A    11/2009
CN    102375682 A    3/2012
(Continued)

*Primary Examiner* — Christopher E Leiby
(74) *Attorney, Agent, or Firm* — Conley Rose, P.C.

(57) ABSTRACT

A method and an apparatus for displaying an operation interface, and a touchscreen terminal, where the method includes: receiving a first pull-down operation in a first set area on a touchscreen; displaying a first operating interface; receiving a second pull-down operation in the second set area on a touchscreen; displaying a second operating interface, wherein display width of the second operating interface is the same as display width of the first operating interface, which is the same as width of the touchscreen.

17 Claims, 10 Drawing Sheets

Related U.S. Application Data

Oct. 14, 2016, now Pat. No. 11,449,166, which is a continuation of application No. PCT/CN2015/076084, filed on Apr. 8, 2015.

(56) References Cited

U.S. PATENT DOCUMENTS

| | | |
|---|---|---|
| 8,542,207 B1 | 9/2013 | Truta et al. |
| 9,996,212 B2 | 6/2018 | Sun et al. |
| 2002/0080195 A1 | 6/2002 | Garrett et al. |
| 2006/0026535 A1 | 2/2006 | Hotelling et al. |
| 2007/0236476 A1 | 10/2007 | Suzuki |
| 2008/0062141 A1 | 3/2008 | Chandhri |
| 2009/0073132 A1 | 3/2009 | Lee et al. |
| 2009/0158149 A1 | 6/2009 | Ko |
| 2009/0307631 A1 | 12/2009 | Kim et al. |
| 2010/0088634 A1 | 4/2010 | Tsuruta et al. |
| 2010/0169813 A1 | 7/2010 | Chang |
| 2010/0175018 A1 | 7/2010 | Petschnigg et al. |
| 2010/0182248 A1 | 7/2010 | Chun |
| 2011/0175930 A1 | 7/2011 | Hwang et al. |
| 2011/0209097 A1* | 8/2011 | Hinckley ............ G06F 3/04883 715/863 |
| 2012/0032901 A1 | 2/2012 | Kwon |
| 2012/0084704 A1 | 4/2012 | Lee et al. |
| 2012/0154303 A1 | 6/2012 | Lazaridis et al. |
| 2012/0235930 A1 | 9/2012 | Lazaridis et al. |
| 2013/0179781 A1* | 7/2013 | Nan ...................... G06F 3/0484 715/711 |
| 2015/0158980 A1 | 6/2015 | Oka et al. |
| 2015/0185980 A1 | 7/2015 | An et al. |
| 2015/0227308 A1* | 8/2015 | Kim ...................... G06F 3/0483 715/769 |
| 2015/0277701 A1 | 10/2015 | Miura |
| 2016/0188197 A1 | 6/2016 | Ryu et al. |

FOREIGN PATENT DOCUMENTS

| | | |
|---|---|---|
| CN | 102799351 A | 11/2012 |
| CN | 103927054 A | 7/2014 |
| GB | 2466524 A | 6/2010 |
| JP | 2010152859 A | 7/2010 |
| JP | 2011238200 A | 11/2011 |
| JP | 2015076008 A | 4/2015 |
| TW | 201025111 A | 7/2010 |

* cited by examiner

METHOD AND APPARATUS FOR DISPLAYING OPERATION INTERFACE AND TOUCHSCREEN TERMINAL

CROSS-REFERENCE TO RELATED APPLICATIONS

This application is a continuation of U.S. patent application Ser. No. 18/304,481, filed on Apr. 21, 2023, which is a continuation of U.S. patent application Ser. No. 17/947,456, filed on Sep. 19, 2022, which is a continuation of U.S. patent application Ser. No. 15/293,811, filed on Oct. 14, 2016 (now U.S. Pat. No. 11,449,166), which is a continuation of International Application No. PCT/CN2015/076084, filed on Apr. 8, 2015, which claims priority to Chinese Patent Application No. 201410150798.8, filed on Apr. 15, 2014. All of the aforementioned patent applications are hereby incorporated by reference in their entireties.

TECHNICAL FIELD

The present invention relates to the field of communications technologies, and in particular, to a method and an apparatus for displaying an operation interface, and a touchscreen terminal.

BACKGROUND

In recent years, touchscreen terminals such as a mobile phone, a tablet computer, and an asynchronous transfer mode (ATM) machine are widely applied because of advantages such as convenient operation, a large screen area, and high resolution. The touchscreen terminals have become necessities in the daily life of people. A touchscreen terminal sometimes hides many operation interfaces. If a user needs the touchscreen terminal to display the operation interfaces, the user needs to perform a corresponding touch operation. After detecting the touch operation, the touchscreen terminal displays a corresponding operation interface for the user to perform an operation.

Two manners for displaying a message notification on a touchscreen terminal are used below as examples for illustration.

A first manner: Assuming that a "status bar" on a touchscreen terminal corresponds to an operation interface of "notification" and an operation interface of "on/off", after a user pulls down the "status bar", the operation interface of "notification" is displayed by default. If the user wants to switch to the operation interface of "on/off", the user needs to tap another switch button, for example, a "tabulator key (Tabulator Key, TAB)", to complete switching between operation interfaces. In the first manner, only the operation interface of "notification" can be displayed when the "status bar" is pulled down for the first time, and an additional switch operation needs to be performed to display the operation interface of "on/off".

A second manner: Assuming that a "status bar" on a touchscreen terminal is set according to left and right subareas, where the left subarea corresponds to an operation interface of "notification", and the right subarea corresponds to an operation interface of "on/off". If a user finds that an operation interface is an unnecessary operation interface after pulling down the left and right subareas, the user needs to collapse the operation interface and perform another pull-down operation. It can be seen that in the second manner, complex operation steps need to be performed to switch between operation interfaces.

SUMMARY

Embodiments of the present invention provide a method and an apparatus for displaying an operation interface, and a touchscreen terminal, to resolve a problem in a prior-art method for displaying an operation interface that when switching between operation interfaces is performed, operation steps are complex and operation efficiency is further affected.

According to a first aspect, a method for displaying an operation interface is provided, including:
  receiving a touch operation that is input by a user in a first set area on a touchscreen; and
  if it is detected that the touch operation ends in a second set area, displaying, on the touchscreen, a second operation interface corresponding to the second set area.

With reference to the first aspect, in a first possible implementation manner of the first aspect, the displaying, on the touchscreen, a second operation interface corresponding to the second set area specifically includes:
  determining a position relationship between the second set area and the first set area;
  if the second set area is located in a first set position of the first set area, using an operation interface located before the first operation interface in a preset operation interface sequence as the second operation interface; and if the second set area is located in a second set position of the first set area, using an operation interface located after the first operation interface in the preset operation interface sequence as the second operation interface; and
  displaying the second operation interface on the touchscreen.

With reference to the first aspect or the first possible implementation manner of the first aspect, in a second possible implementation manner of the first aspect, the method further includes:
  if it is detected that the touch operation ends in the first set area, displaying, on the touchscreen, the first operation interface corresponding to the first set area.

With reference to the second possible implementation manner of the first aspect, in a third possible implementation manner of the first aspect, after the receiving a touch operation that is input by a user in a first set area on a touchscreen, before the displaying, on the touchscreen, a second operation interface corresponding to the second set area, the method further includes:
  displaying a part of the first operation interface, and displaying a prompt for switching between operation interfaces.

According to a second aspect, an apparatus for displaying an operation interface is provided, including:
  a receiving unit, configured to receive a touch operation that is input by a user in a first set area on a touchscreen;
  a detection unit, configured to detect whether the touch operation ends in a second set area; and
  a first display unit, configured to: if the detection unit detects that the touch operation ends in the second set area, display, on the touchscreen, a second operation interface corresponding to the second set area.

With reference to the second aspect, in a first possible implementation manner of the second aspect, the first display unit includes:

a determining subunit, configured to determine a position relationship between the second set area and the first set area;

a decision subunit, configured to: if the determining subunit determines that the second set area is located in a first set position of the first set area, use an operation interface located before the first operation interface in a preset operation interface sequence as the second operation interface; and if the determining subunit determines that the second set area is located in a second set position of the first set area, use an operation interface located after the first operation interface in the preset operation interface sequence as the second operation interface; and a display subunit, configured to display the second operation interface on the touchscreen.

With reference to the second aspect or the first possible implementation manner of the second aspect, in a second possible implementation manner of the second aspect, the apparatus further includes a second display unit, configured to:

if the detection unit detects that the touch operation ends in the first set area, display, on the touchscreen, the first operation interface corresponding to the first set area.

With reference to the second possible implementation manner of the second aspect, in a third possible implementation manner of the second aspect, the apparatus further includes a third display unit, configured to:

after the receiving unit receives the touch operation that is input by the user in the first set area on the touchscreen, before the first display unit displays, on the touchscreen, the second operation interface corresponding to the second set area, display a part of the first operation interface, and display a prompt for switching between operation interfaces.

According to a third aspect, a touchscreen terminal is provided, including:

a transceiver, configured to receive a touch operation that is input by a user in a first set area on a touchscreen;

a processor, configured to detect whether the touch operation ends in a second set area; and a first display, configured to: if the processor detects that the touch operation ends in the second set area, display, on the touchscreen, a second operation interface corresponding to the second set area.

With reference to the third aspect, in a first possible implementation manner of the third aspect, the first display includes:

a determining subunit, configured to determine a position relationship between the second set area and the first set area;

a decision subunit, configured to: if the determining subunit determines that the second set area is located in a first set position of the first set area, use an operation interface located before the first operation interface in a preset operation interface sequence as the second operation interface; and if the determining subunit determines that the second set area is located in a second set position of the first set area, use an operation interface located after the first operation interface in the preset operation interface sequence as the second operation interface; and a display subunit, configured to display the second operation interface on the touchscreen.

With reference to the third aspect or the first possible implementation manner of the third aspect, in a second possible implementation manner of the third aspect, the apparatus further includes a second display, configured to:

if the processor detects that the touch operation ends in the first set area, display, on the touchscreen, the first operation interface corresponding to the first set area.

With reference to the second possible implementation manner of the third aspect, in a third possible implementation manner of the third aspect, the apparatus further includes a third display, configured to:

after the transceiver receives the touch operation that is input by the user in the first set area on the touchscreen, before the first display displays, on the touchscreen, the second operation interface corresponding to the second set area, display a part of the first operation interface, and display a prompt for switching between operation interfaces.

According to the method for displaying an operation interface provided by the first aspect, the apparatus for displaying an operation interface provided by the second aspect, or the touchscreen terminal provided by the third aspect, after a touch operation that is input by a user in a first set area on a touchscreen is received, a first operation interface corresponding to the first set area is not directly displayed, and instead, an area in which the touch operation ends is detected; if the touch operation ends in a second set area, that is, the touch operation input by the user in the first set area is a misoperation, in this case, the user only needs to adjust the touch operation so that the touch operation ends in the second set area, and in this way, the user can still obtain a needed operation interface by means of one touch operation, and does not need to perform complex operation steps to switch between operation interfaces. Compared with a prior-art method for displaying an operation interface, a quantity of operation steps is reduced, and operation efficiency is improved.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person skilled in the art may still derive other drawings from these accompanying drawings without creative efforts.

DETAILED DESCRIPTION

To resolve a problem in a prior-art method for displaying an operation interface that when operation interfaces is switched, operation steps are complex and operation efficiency is further affected, an embodiment of the present invention provides a method for displaying an operation interface. The method may be executed by, but is not limited to, a touchscreen terminal.

Figure 1:
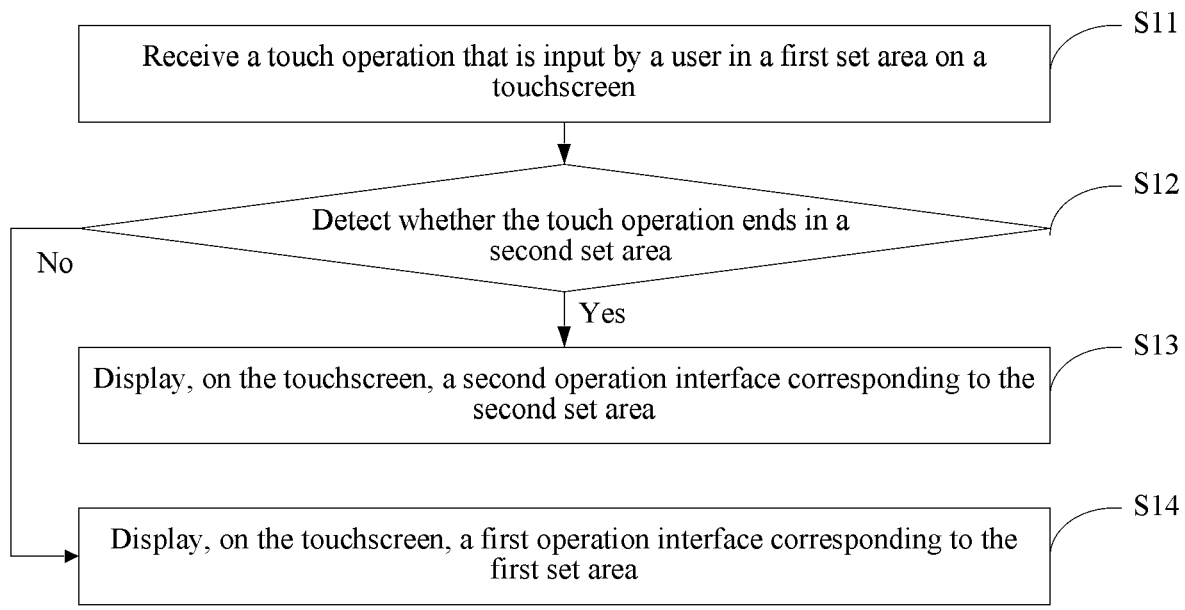
FIG. 1 is a flowchart of a method for displaying an operation interface according to an embodiment of the present invention.

A process of the method is described in the following by using an example in which the touchscreen terminal executes the method. As shown in FIG. 1, specific steps of the method include:

S11: Receive a touch operation that is input by a user in a first set area on a touchscreen.

A touchscreen of a touchscreen terminal generally has four edges, and an operation interface can be set and hidden on each edge. For example, in an Android system, a "status bar" can be hidden on an upper edge of a touchscreen. Certainly, the "status bar" may be hidden on a left edge, a right edge, or the lower edge of the touchscreen. An example in which the "status bar" is hidden on the upper edge is used below for illustration.

Figure 2:
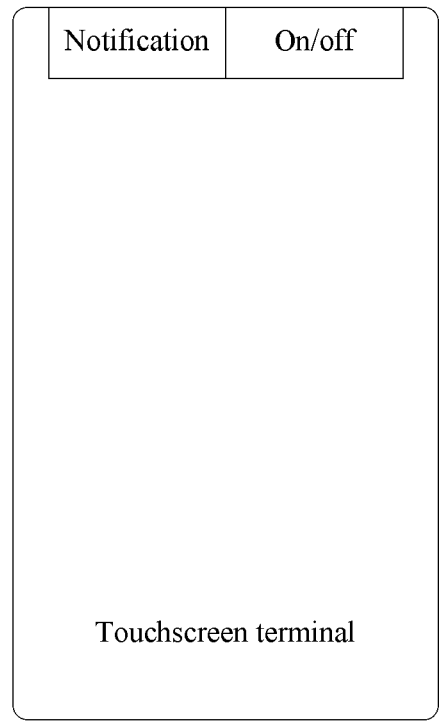
FIG. 2 is a flowchart of a method for processing a media file according to another embodiment of the present invention.

The "status bar" may be set according to left and right subareas. The left subarea corresponds to an operation interface of "notification", and the right subarea corresponds to an operation interface of "on/off". The operation interfaces of "notification" and "on/off" are hidden on the upper edge of the touchscreen. When a user needs to display the operation interface of "notification", the user may pull down the left subarea on the upper edge of the touchscreen. When the user needs to display the operation interface of "on/off", the user may pull down the right subarea on the upper edge of the touchscreen. For the convenience of identification by a user, as shown in FIG. 2, a "notification" button and an "on/off" button may be set. The "notification" button and the "on/off" button are also usually hidden, and after the user performs the pull-down operation, the "notification" button and the "on/off" button can be displayed. An example in which the "notification" button and the "on/off" button are set is used below for illustration.

The touch operation performed by the user in the first set area on the touchscreen terminal can be received by the touchscreen terminal, where the first set area, that is, the area in which the user inputs the touch operation, may be the left subarea, or may be the right subarea.

S12: Detect whether the touch operation ends in a second set area; if it is detected that the touch operation ends in the second set area, perform S13; and if it is detected that the touch operation ends in the first set area, perform S14.

An operation interface that needs to be displayed may be determined by detecting an area in which the touch operation of the user ends.

S13: Display, on the touchscreen, a second operation interface corresponding to the second set area.

When the touch operation ends in the second set area, the second operation interface corresponding to the second set area is displayed.

Figure 3:
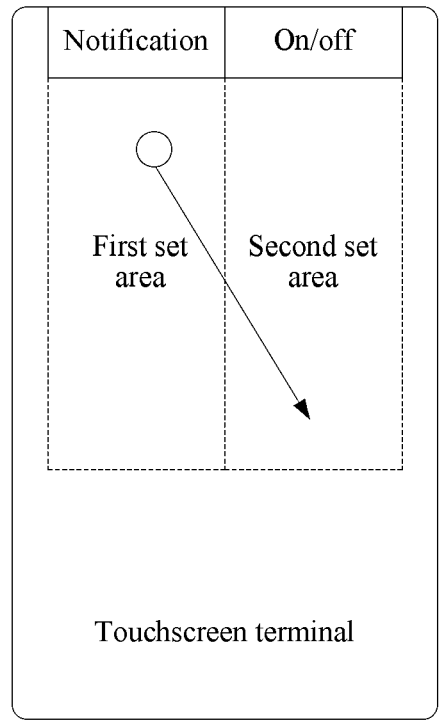
FIG. 3 is a schematic diagram showing that a touch operation starts in a first set area and ends in a second set area according to an embodiment of the present invention.

Continuing with the foregoing example, as shown in FIG. 3, if the first set area is the left subarea of the touchscreen, and the area in which the touch operation ends is the right subarea, that is, the second set area, an operation interface corresponding to the right subarea is displayed, that is, the operation interface of "on/off" is displayed.

S14: Display, on the touchscreen, a first operation interface corresponding to the first set area.

When the touch operation ends in the first set area, the first operation interface corresponding to the first set area is displayed.

Figure 4:
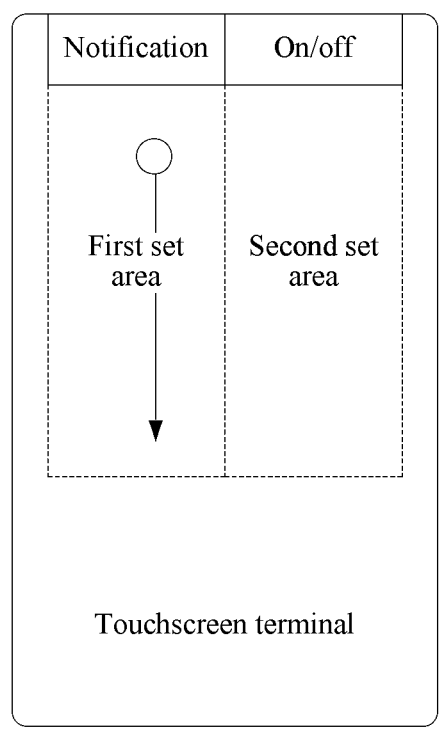
FIG. 4 is a schematic diagram showing that a touch operation starts in a first set area and ends in the first set area according to an embodiment of the present invention.

Continuing with the foregoing example, as shown in FIG. 4, if the first set area is the left subarea of the touchscreen, and the area in which the touch operation ends is also the left subarea, an operation interface corresponding to the left subarea is displayed, that is, the operation interface of "notification" is displayed.

In this solution, after a touch operation that is input by a user in a first set area on a touchscreen is received, a first operation interface corresponding to the first set area is not directly displayed, and instead, an area in which the touch operation ends is detected; if the touch operation ends in a second set area, that is, the touch operation input by the user in the first set area is a misoperation, in this case, the user only needs to adjust the touch operation so that the touch operation ends in the second set area, and in this way, the user can still obtain a needed operation interface by means of one touch operation, and does not need to perform complex operation steps to switch between operation interfaces. Compared with a prior-art method for displaying an operation interface, a quantity of operation steps is reduced, and operation efficiency is improved.

Specifically, the displaying, on the touchscreen, a second operation interface corresponding to the second set area in the foregoing S13 specifically includes:

determining a position relationship between the second set area and the first set area;

if the second set area is located in a first set position of the first set area, using an operation interface located before the first operation interface in a preset operation interface sequence as the second operation interface; and if the second set area is located in a second set position of the first set area, using an operation interface located after the first operation interface in the preset operation interface sequence as the second operation interface; and displaying the second operation interface on the touchscreen.

The second operation interface corresponding to the second set area needs to be displayed on the touchscreen according to a position relationship between the second set area and the first set area.

Continuing with the foregoing example, when the first set area is the left subarea, and the second set area is the right subarea, that is, the second set area is located on the right side of the first set area, in this case, the first set position is the right side. An operation interface sequence may be preset on the touchscreen terminal. Because the second set area is located on the right side of the first set area, an operation interface located before the first operation interface in the preset operation interface sequence is used as the second operation interface. Operation interfaces to be displayed are sequentially stored in the preset operation interface sequence, and operation interfaces corresponding to the left subarea may be used as a preset operation interface sequence.

When the first set area is the right subarea, and the second set area is the left subarea, that is, the second set area is located on the left side of the first set area, in this case, the second set position is the left side. Because the second set area is located on the left side of the first set area, an operation interface located after the first operation interface in the preset operation interface sequence is used as the second operation interface.

After the second operation interface is determined, the second operation interface may be displayed on the touchscreen.

Optionally, after the receiving a touch operation input by a user in a first set area on a touchscreen in the foregoing S11, before the displaying, on the touchscreen, a second operation interface corresponding to the second set area in the foregoing S13, the method further includes:

displaying a part of the first operation interface, and displaying a prompt for switching between operation interfaces.

Figure 5:
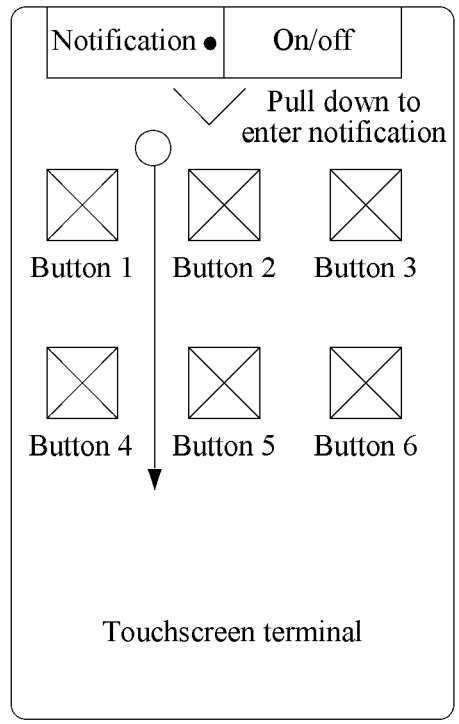
FIG. 5 is a schematic diagram of displaying a part of a first operation interface according to an embodiment of the present invention.

Continuing with the foregoing example, after the user performs the pull-down operation in the left subarea, a part or all of the operation interface corresponding to the left subarea may be displayed, as shown in FIG. 5.

Figure 6:
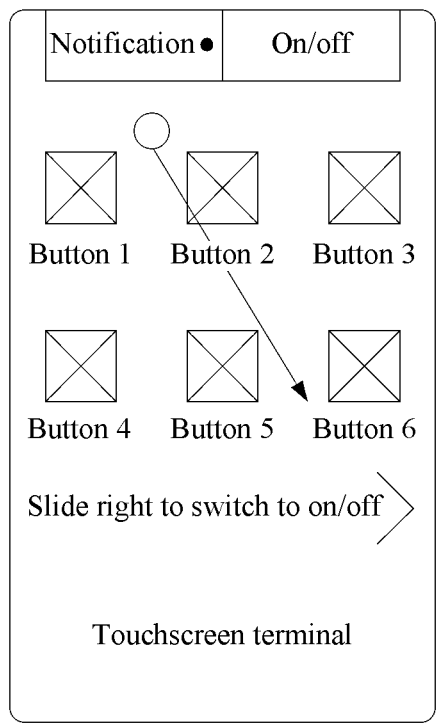
FIG. 6 is a schematic diagram of a prompt manner that combines "slide right to switch to on/off" and a gesture of sliding down to the right according to an embodiment of the present invention.
Figure 7:
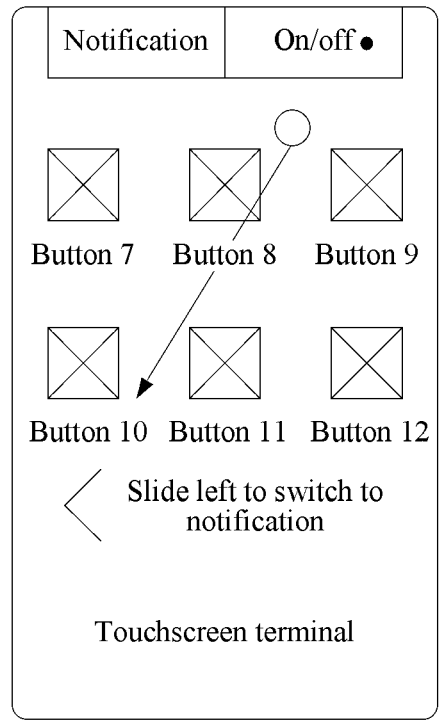
FIG. 7 is a schematic diagram of a prompt manner that combines "slide left to switch to notification" and a gesture of sliding down to the left according to an embodiment of the present invention.

A prompt for switching between operation interfaces may be displayed. If the user finds, according to the displayed operation interface, that the pull-down operation is performed in a wrong area, the user further switches to a needed operation interface according to the prompt. This manner can further help the user to open the needed operation interface quickly, and save the user the memorization difficulty and the trouble of complex operation steps caused by the misoperation. A manner for displaying a prompt for switching between operation interfaces may be a manner of a text prompt, a manner of a gesture prompt, or a manner that combines both, or the like. FIG. 6 and FIG. 7 respectively show a prompt manner that combines "slide right to switch to on/off" and a gesture of sliding down to the right and a prompt manner that combines "slide left to switch to notification" and a gesture of sliding down to the left.

Figure 8:
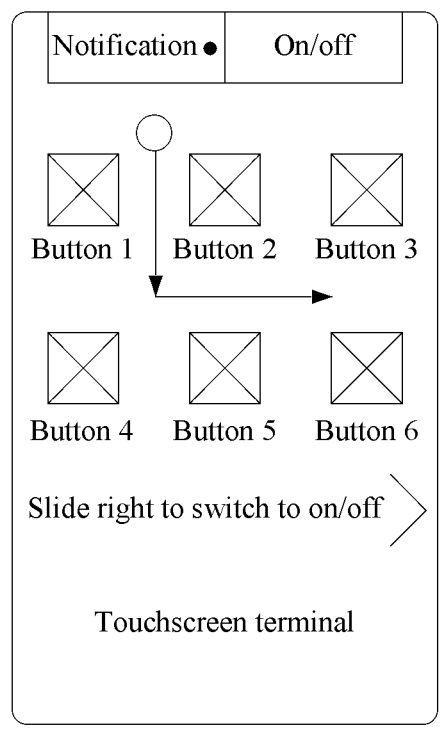
FIG. 8 is a schematic diagram of a touch operation in a first application scenario in which during a process of pulling down a left subarea, a user finds that a misoperation is performed and then switches to an operation interface according to an embodiment of the present invention.

A manner in which the touchscreen terminal switches between operation interfaces may include the following two application scenarios:

A first application scenario: As shown in FIG. 8, during a process of pulling down the left subarea, the user finds that a misoperation is performed. In this case, the user may slide to the right side and stop in the right subarea, and the touchscreen terminal switches, according to the area in which the user ends the touch operation, to an operation interface corresponding to the right subarea.

Figure 9:
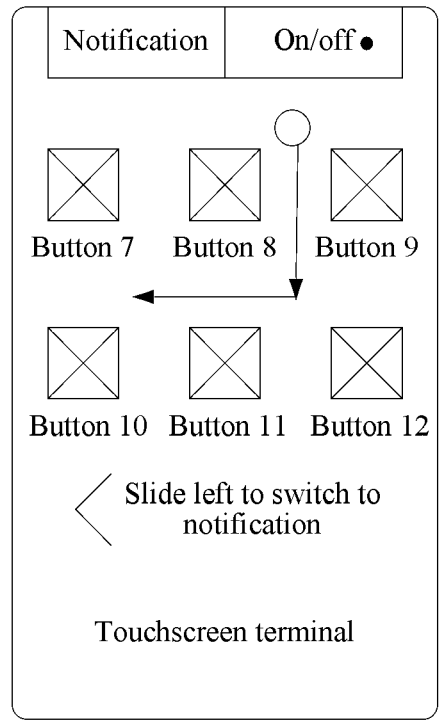
FIG. 9 is a schematic diagram of a touch operation in a first application scenario in which during a process of pulling down a right subarea, a user finds that a misoperation is performed and then switches to an operation interface according to an embodiment of the present invention.

Alternatively, as shown in FIG. 9, during a process of pulling down the right subarea, the user finds that a misoperation is performed. In this case, the user may slide to the left side and stop in the left subarea, and the touchscreen terminal switches, according to the area in which the user ends the touch operation, to an operation interface corresponding to the left subarea.

Figure 10:
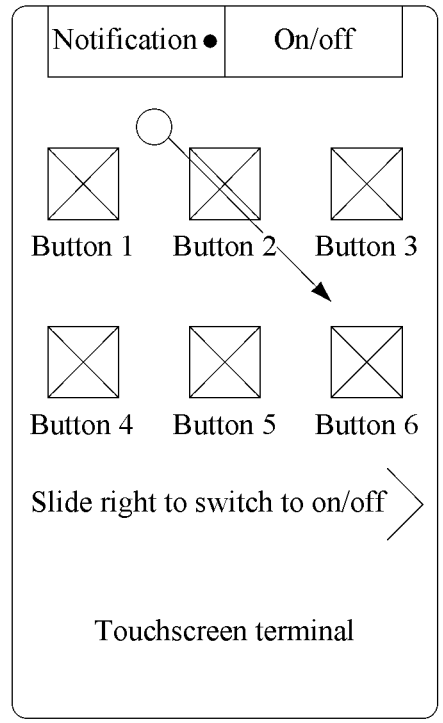
FIG. 10 is a schematic diagram of a touch operation in a second application scenario in which during a process of pulling down a left subarea, a user finds that a misoperation is performed and then switches to an operation interface according to an embodiment of the present invention.

A second application scenario: As shown in FIG. 10, immediately after pulling down the left subarea, the user finds that a misoperation is performed. In this case, the user may directly slide down to the right and stop in the right subarea, and the touchscreen terminal switches, according to the area in which the user ends the touch operation, to an operation interface corresponding to the right subarea.

Figure 11:
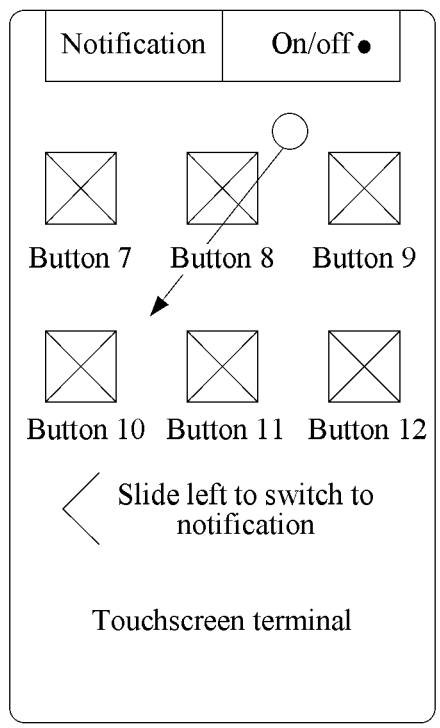
FIG. 11 is a schematic diagram of a touch operation in a second application scenario in which during a process of pulling down a right subarea, a user finds that a misoperation is performed and then switches to an operation interface according to an embodiment of the present invention.

Alternatively, as shown in FIG. 11, immediately after pulling down the right subarea, the user finds that a misoperation is performed. In this case, the user may directly slide down to the left and stop in the left subarea, and the touchscreen terminal switches, according to the area in which the user ends the touch operation, to an operation interface corresponding to the left subarea.

By means of the method for displaying an operation interface in the embodiments of the present invention, after a user performs a misoperation, the user may directly switch to a needed operation interface, and does not need to perform complex operation steps to switch between operation interfaces. Compared with a prior-art method for displaying an operation interface, a quantity of operation steps is reduced, and operation efficiency is improved.

Figure 12:
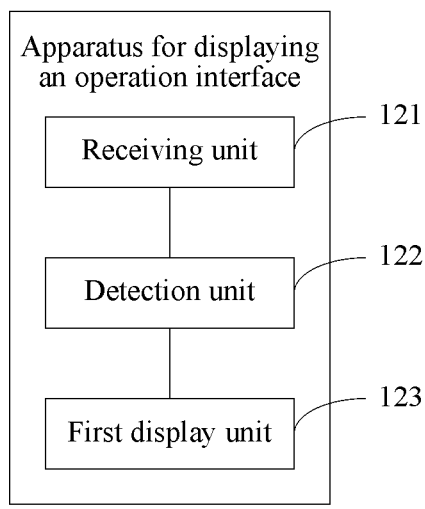
FIG. 12 is a schematic structural diagram of an apparatus for displaying an operation interface according to an embodiment of the present invention.

Based on the same inventive concept, an embodiment of the present invention further provides an apparatus for displaying an operation interface, where a structure of the apparatus is shown in FIG. 12, including:

a receiving unit 121, configured to receive a touch operation that is input by a user in a first set area on a touchscreen;

a detection unit 122, configured to detect whether the touch operation ends in a second set area; and a first display unit 123, configured to: if the detection unit detects that the touch operation ends in the second set area, display, on the touchscreen, a second operation interface corresponding to the second set area.

Figure 13:
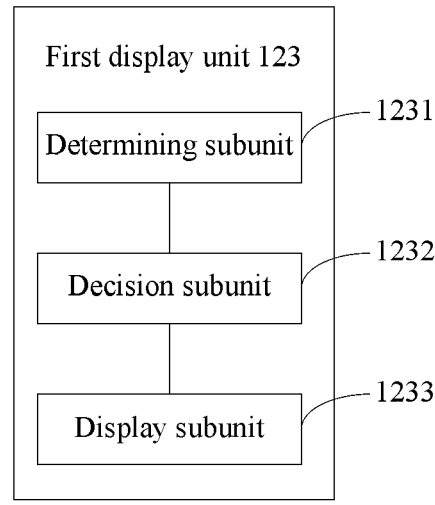
FIG. 13 is a schematic structural diagram of a first display unit according to an embodiment of the present invention.

Specifically, as shown in FIG. 13, the first display unit 123 includes:

a determining subunit 1231, configured to determine a position relationship between the second set area and the first set area;

a decision subunit 1232, configured to: if the determining subunit determines that the second set area is located in a first set position of the first set area, use an operation interface located before the first operation interface in a preset operation interface sequence as the second operation interface; and if the determining subunit determines that the second set area is located in a second set position of the first set area, use an operation interface located after the first operation interface in the preset operation interface sequence as the second operation interface; and a display subunit 1233, configured to display the second operation interface on the touchscreen.

Figure 14:
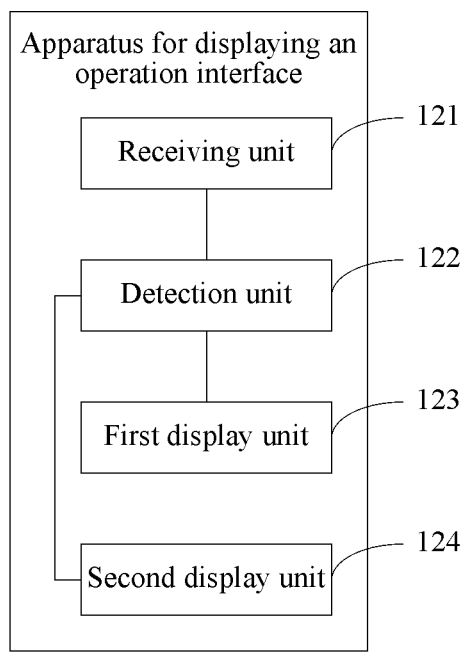
FIG. 14 is a schematic structural diagram of another apparatus for displaying an operation interface according to an embodiment of the present invention.

Optionally, as shown in FIG. 14, the apparatus for displaying an operation interface further includes a second display unit 124, configured to:

if the detection unit detects that the touch operation ends in the first set area, displaying, on the touchscreen, the first operation interface corresponding to the first set area.

Figure 15:
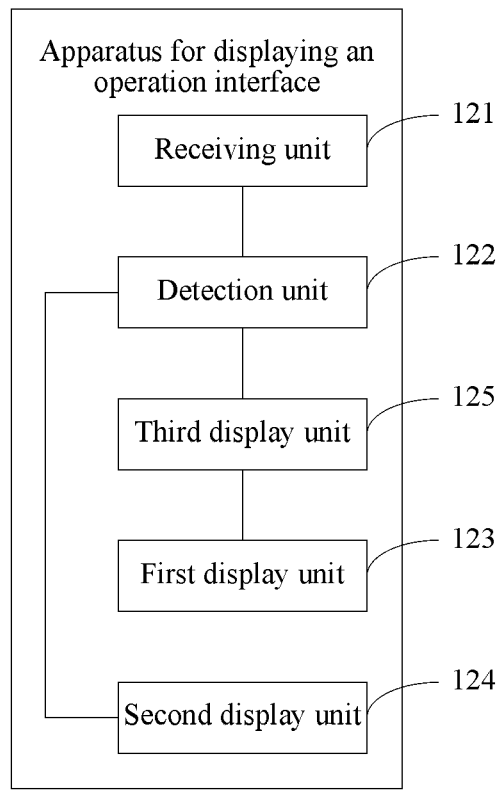
FIG. 15 is a schematic structural diagram of a third apparatus for displaying an operation interface according to an embodiment of the present invention.

Optionally, as shown in FIG. 15, the apparatus for displaying an operation interface further includes a third display unit 125, configured to:

after the receiving unit receives the touch operation that is input by the user in the first set area on the touchscreen, before the first display unit displays, on the touchscreen, the second operation interface corresponding to the second set area, display a part of the first operation interface, and display a prompt for switching between operation interfaces.

Figure 16:
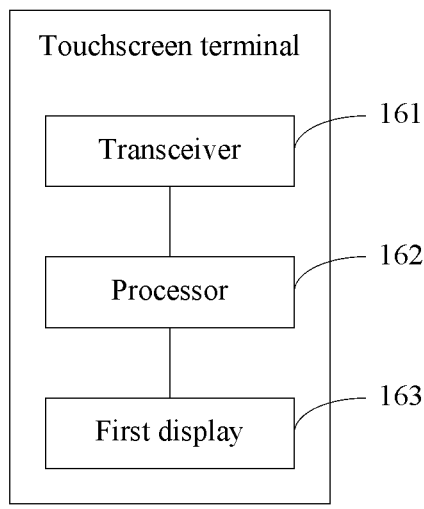
FIG. 16 is a schematic structural diagram of a touchscreen terminal according to an embodiment of the present invention.

Based on the same inventive concept, an embodiment of the present invention further provides a touchscreen terminal, where a structure of the touchscreen terminal is shown in FIG. 16, including:

a transceiver 161, configured to receive a touch operation that is input by a user in a first set area on a touchscreen;

a processor 162, configured to detect whether the touch operation ends in a second set area; and a first display 163, configured to: if the processor detects that the touch operation ends in the second set area, display, on the touchscreen, a second operation interface corresponding to the second set area.

The transceiver 161, the processor 162, and the first display 163 are connected to each other by using a bus.

Figure 17:
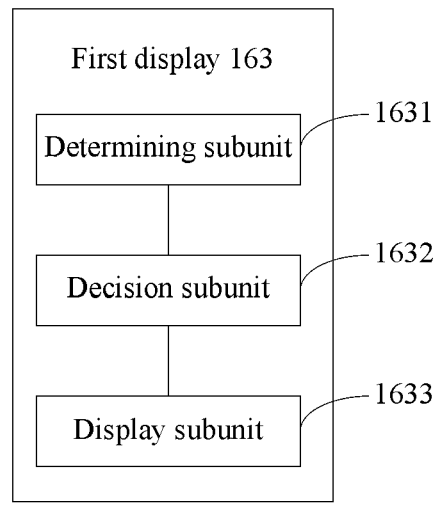
FIG. 17 is a schematic structural diagram of a first display according to an embodiment of the present invention.

Specifically, as shown in FIG. 17, the first display 163 includes:

a determining subunit 1631, configured to determine a position relationship between the second set area and the first set area;

a decision subunit 1632, configured to: if the determining subunit determines that the second set area is located in a first set position of the first set area, use an operation interface located before the first operation interface in a preset operation interface sequence as the second operation interface; and if the determining subunit determines that the second set area is located in a second set position of the first set area, use an operation interface located after the first operation interface in the preset operation interface sequence as the second operation interface; and a display subunit 1633, configured to display the second operation interface on the touchscreen.

Figure 18:
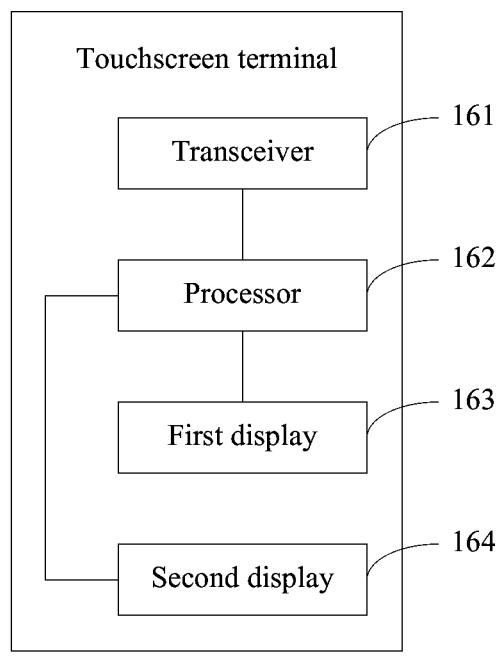
FIG. 18 is a schematic structural diagram of another touchscreen terminal according to an embodiment of the present invention.

Optionally, as shown in FIG. 18, the apparatus for displaying an operation interface further includes a second display 164, configured to:

if the processor detects that the touch operation ends in the first set area, display, on the touchscreen, the first operation interface corresponding to the first set area.

Figure 19:
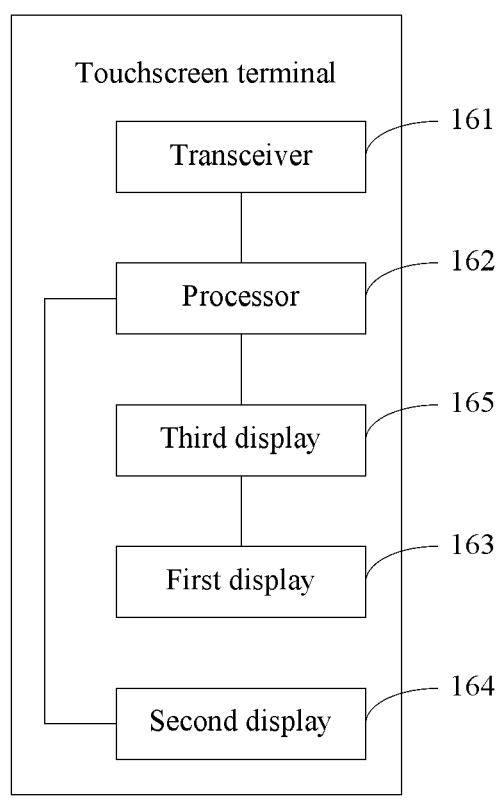
FIG. 19 is a schematic structural diagram of a third touchscreen terminal according to an embodiment of the present invention.

Optionally, as shown in FIG. 19, the apparatus for displaying an operation interface further includes a third display 165, configured to:

after the transceiver receives the touch operation that is input by the user in the first set area on the touchscreen, before the first display displays, on the touchscreen, the second operation interface corresponding to the second set area, display a part of the first operation interface, and display a prompt for switching between operation interfaces.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions performed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions performed on the computer or the another programmable device provide steps for implementing a specific function in one or more processes in the flowcharts and/or in one or more blocks in the block diagrams.

Although available embodiments of the present invention have been described, persons skilled in the art can make changes and modifications to these embodiments once they learn the basic inventive concept. Therefore, the following claims are intended to be construed as to cover the available embodiments and all changes and modifications falling within the scope of the present invention.

Obviously, persons skilled in the art can make various modifications and variations to the embodiments of the present invention without departing from the spirit and scope of the embodiments of the present invention. The present invention is intended to cover these modifications and variations provided that they fall within the scope of protection defined by the following claims and their equivalent technologies.

What is claimed is:

1. A method for displaying operating interfaces on a touchscreen, comprising:

receiving a pull-down operation in a first set area, wherein the first set area and a second set area are continuous areas on the touchscreen, wherein the first set area and the second set area are different, do not overlap and are arranged adjacent to the left and right, wherein the pull-down operation starts at a top left edge of the touchscreen within the first set area and ends away from the top left edge of the touchscreen at a first end point within the first set area;

displaying a first operating interface in response to receiving the pull-down operation, wherein the first operating interface is not displayed prior to the pull-down operation, and the first operating interface comprises a notification interface;

receiving a slide operation while the first operating interface is displayed, wherein the slide operation ends away from a top right edge of the touchscreen at a second end point within the second set area; and displaying a second operating interface in response to receiving the slide operation, wherein the second operating interface is not displayed prior to the slide operation, wherein the first operating interface is different from the second operating interface, wherein the second operating interface comprises at least one on/off button, wherein a display width of the second operating interface is the same as a display width of the first operating interface, which is the same as a width of the touchscreen.

2. The method of claim 1, wherein the first operating interface is displayed in a top-down continuous manner.

3. The method of claim 2, wherein the second operating interface is displayed in a top-down continuous manner.

4. The method of claim 1, wherein the first set area is contiguous with the second set area.

5. The method of claim 1, wherein the first operating interface comprises a first set of buttons and first textual content, the second operating interface comprises a second set of buttons and second textual content, and the first textual content comprises different information than the second textual content.

6. The method of claim 1, wherein before receiving the pull-down operation, the method further comprises displaying a home screen that comprises a plurality of icon buttons.

7. A terminal, comprising:
a touchscreen; and
one or more processors configured to:
receive a pull-down operation in a first set area, wherein the first set area and a second set area are continuous areas on the touchscreen, wherein the first set area and the second set area are different, do not overlap, and are arrange adjacent to the left and right, wherein the pull-down operation starts at a top left edge of the touchscreen within the first set area and ends away from the top left edge of the touchscreen at a first end point within the first set area;

display a first operating interface in response to receiving the pull-down operation, wherein the first operating interface is not displayed prior to the pull-down operation, and the first operating interface comprises a notification interface;

receive a slide operation while the first operating interface is displayed, wherein the slide operation ends away from a top right edge of the touchscreen at a second point within the second set area; and display a second operating interface in response to receiving the slide operation, wherein the second operating interface is not displayed prior to the slide operation, wherein the first operating interface is different from the second operating interface, wherein the second operating interface comprises at least one on/off button, wherein a display width of the second operating interface is the same as a display width of the first operating interface, which is the same as a width of the touchscreen.

8. The terminal of claim 7, wherein the first operating interface is displayed in a top-down continuous manner.

9. The terminal of claim 8, wherein the second operating interface is displayed in a top-down continuous manner.

10. The terminal of claim 7, wherein the first set area is contiguous with the second set area.

11. The terminal of claim 7, wherein the first operating interface comprises a first set of buttons and first textual content, the second operating interface comprises a second set of buttons and second textual content, and the first textual content comprises different information than the second textual content.

12. The terminal of claim 7, wherein before receiving the pull-down operation, the processor is further configured to display a home screen that comprises a plurality of icon buttons.

13. A computer program product, comprising:
computer-executable instructions for storage on a non-transitory computer-readable medium, wherein the instructions, when executed by one or more processors of a terminal, cause the terminal to:
receive a pull-down operation in a first set area, wherein the first set area and a second set area are continuous areas on a touchscreen of the terminal, wherein the first set area and the second set area are different, do not overlap and are arranged adjacent to the left and right, wherein the pull-down operation starts at a top left edge of the touchscreen within the first set area and ends away from the top left edge of the touchscreen at a first end point within the first set area;

display a first operating interface in response to receiving the pull-down operation, wherein the first operating interface is not displayed prior to the pull-down operation, and the first operating interface comprises a notification interface;

receive a slide operation while the first operating interface is displayed, wherein the slide operation ends away from a top right edge of the touchscreen at a second end point within the second set area; and display a second operating interface in response to receiving the slide operation, wherein the second operating interface is not displayed prior to the slide operation, wherein the first operating interface is different from the second operating interface, wherein the second operating interface comprises at least one on/off button, wherein a display width of the second operating interface is the same as a display width of the first operating interface, which is the same as a width of the touchscreen.

14. The computer program product of claim 13, wherein the first operating interface is displayed in a top-down continuous manner.

15. The computer program product of claim 13, wherein the second operating interface is displayed in a top-down continuous manner.

16. The computer program product of claim 13, wherein the first set area is contiguous with the second set area.

17. The computer program product of claim 15, wherein the first operating interface comprises a first set of buttons and first textual content, the second operating interface comprises a second set of buttons and second textual content, and the first textual content comprises different information than the second textual content.

\* \* \* \* \*